(No Model.)
W. B. ALLEN.
Hand Truck.
No. 233,720.    Patented Oct. 26, 1880.
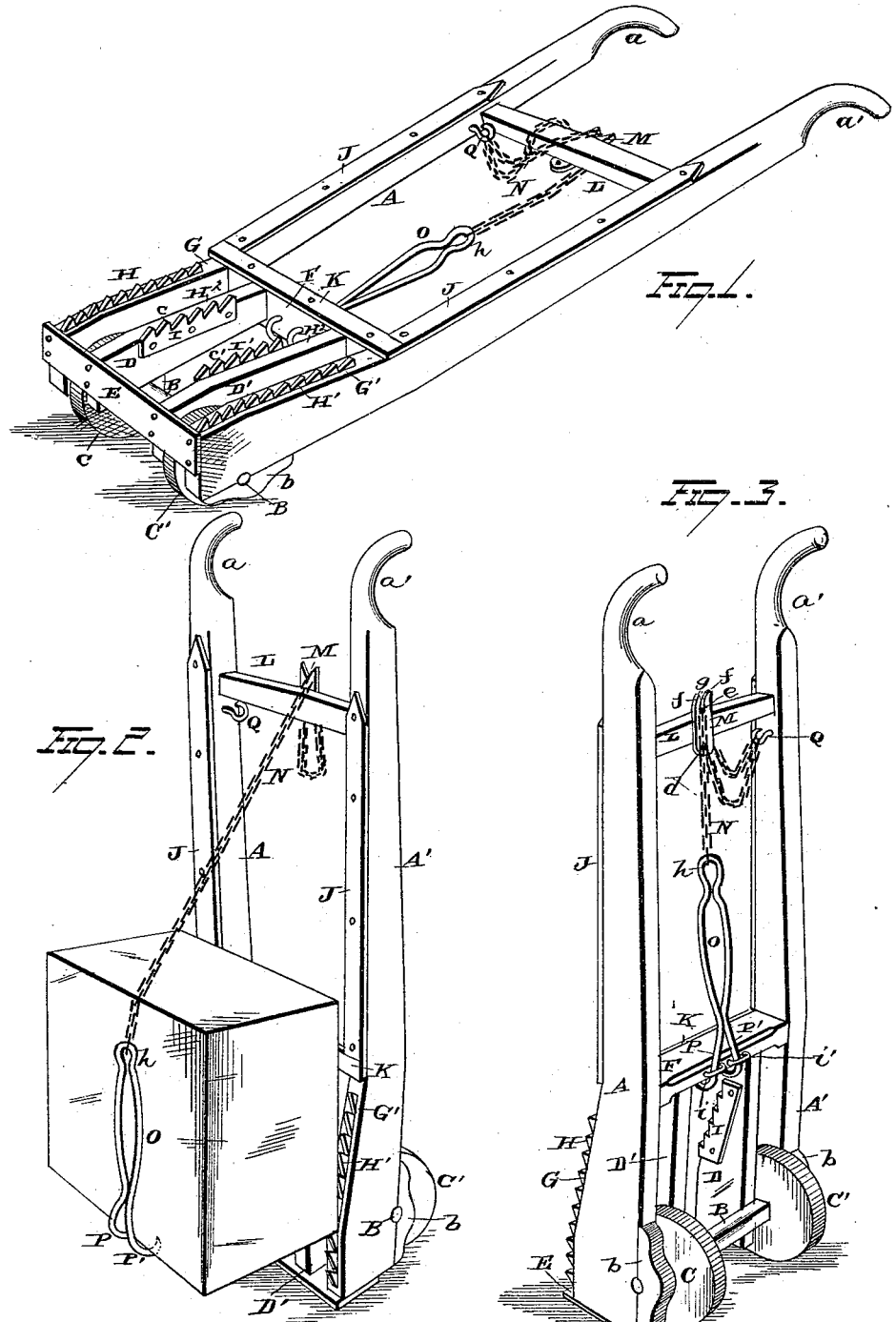
WITNESSES
E. Nottingham
A. L. Lawrence
INVENTOR
Wm B. Allen,
By H. A. Seymour,
ATTORNEY

UNITED STATES PATENT OFFICE.

WILLIAM B. ALLEN, OF ORLEANS, NEW YORK.

HAND-TRUCK.

SPECIFICATION forming part of Letters Patent No. 233,720, dated October 26, 1880.

Application filed July 14, 1880. (No model.)

*To all whom it may concern:*

Be it known that I, WILLIAM B. ALLEN, of Orleans, in the county of Ontario and State of New York, have invented certain new and useful Improvements in Trucks; and I do hereby declare the following to be a full, clear, and exact description of the invention, such as will enable others skilled in the art to which it pertains to make and use it, reference being had to the accompanying drawings, which form part of this specification.

My invention relates to an improvement in trucks, the object being to provide a truck of such construction that stoves, boxes, or bales may be readily raised from the floor and transported to any desired point; and with this end in view my invention consists, essentially, in a truck provided with bars downwardly inclined from the nose-piece of the truck to a point in rear of the axle.

My invention further consists in certain other details of construction and combinations of parts, as will hereinafter be described, and pointed out in the claims.

In the accompanying drawings, Figure 1 is a view, in perspective, of a truck embodying my improvement. Fig. 2 is a view, in perspective, of the truck in its vertical position; and Fig. 3 is a view, in perspective, of the under side of the truck.

A A' are the side frame-pieces of the truck, terminating at their rear ends in handles $a\,a'$, and having the supporting-axle B secured to the lower edges of their forward ends by means of the half bearing-plates $b$.

Supporting-wheels C C' are loosely journaled upon the opposite ends of axle B, between the inner sides of frame-pieces A A' and outer sides of the inclined bars D D', which latter are secured at their forward ends to the nose-piece E and at their rear ends to the cross-bar F.

The forward ends of the side frame-pieces, A A', are formed with inclined upper edges, G G', which may be faced with smooth strap-iron or cast-metal plates, but are preferably faced with toothed or corrugated plates H H'. The intermediate bars are also formed with inclined upper edges, $H^2$, which are provided with cast or wrought metal bars or plates I I', having notched, toothed, or corrugated engaging-surfaces $c\,c'$. Nose-piece E extends slightly above the edges of the inclines G G' and $H^2$, to enable its forward edge to be inserted beneath any object to be raised. The upper edges of the frame-pieces A A' are faced with metal strips J and the cross-bar F with a metal strip, K.

To the under side of the rear cross-bar, L, is secured the metal plate M, the forward end of which is perforated, as at $d$, for the attachment of the rear end of a chain, N, while the rear end of said plate is downwardly curved and provided with a slot, $e$, the arms $f$ being outwardly beveled, as at $g$. To the forward end of the chain is secured the hook O, which consists of a metal bar bent upon itself, forming an eye, $h$, for the attachment of the end of the chain, while the ends of the bar are formed into two diverging hooks, P P'.

To the under side of cross-bar F are secured the staples $i\,i'$, through which the hooks P P' are inserted, as illustrated in Fig. 3, when not desired for use, the chain being wound around the rear cross-bar and fastened into the hook Q, inserted in the inner side of one of the frame-pieces A A'.

In operating the truck to move stoves or ranges having either square or round bottoms the truck is raised to its vertical position and the nose of the truck run under the bottom of the stove, thereby causing the edge of the stove-bottom to impinge against the inclined bars on the forward end of the truck. The double hooks P P' are then engaged with the top of the stove, and the slack chain being drawn up, one of the links of the chain is inserted in the slot $e$ in the plate M, which latter prevents the chain from slipping. As the handle end of the truck is lowered the chain will tighten and operate to pull the weight toward the truck, causing the bottom of the stove to impinge against the inclined bars with sufficient frictional contact to prevent the stove from slipping, and enabling it to be readily transported from place to place.

The corrugated or notched metal plates attached to the inclined supporting-bars serve to insure a secure and firm grasp upon the bottom of the stove and prevent it from slipping, and also serve to protect the truck from any undue wear.

It will be observed that by the employment of my improved truck stoves of different heights from the floor may be readily seized by the inclined forward end of the truck, and also any object, as a box or bag, resting upon the floor may be readily loaded thereon.

The corrugated metal plates are preferably formed with blunt-pointed corrugations or projections, to enable the truck to be employed in transporting bags without tearing them in the operation.

Having fully described my invention, what I claim as new, and desire to secure by Letters Patent, is—

1. A truck provided with inclined bars on its forward end, having corrugated, toothed, or notched plates secured to the upper edges of said bars, substantially as set forth.

2. A truck having inclined bars on its forward end and a nose-piece projecting beyond said bars, substantially as set forth.

3. In a truck, the combination, with side frame-pieces upwardly inclined at their forward ends, of upwardly-inclined bars located between said side frame-pieces, substantially as set forth.

4. In a truck, the combination, with the side frame-pieces and nose-piece secured to their forward ends, of inclined bars located between the side frame-pieces and secured at their forward ends to the nose-piece and at their rear ends to a cross-bar, substantially as set forth.

5. In a truck, the combination, with the holding-chain, of a metal plate secured to the rear cross-bar, said plate formed with a narrow slot for the insertion of one of the links of the chain, and to retain the chain against displacement, substantially as set forth.

6. In a truck, the combination, with the holding-chain, of a metal plate secured to the rear cross-bar, said plate being provided with an eye at one end for the attachment of one end of the chain and an open slot in its opposite end for the adjustable attachment of the chain throughout any portion of its length, substantially as set forth.

7. In a truck, the combination, with two diverging hooks attached to the holding-chain, of staples driven into one of the cross-bars and adapted to retain the hook in position when not employed, substantially as set forth.

8. The combination, with the lifting frame or bars of a truck, of corrugated or notched plates secured to the upper faces or surfaces of said frame or bars, substantially as and for the purpose set forth.

In testimony that I claim the foregoing I have hereunto set my hand and seal this 7th day of July, 1880.

WILLIAM B. ALLEN. [L. S.]

Witnesses:
EDWIN WARNER,
JOHN P. SPEAR.